US012332103B2

(12) United States Patent
Hirano et al.

(10) Patent No.: US 12,332,103 B2
(45) Date of Patent: Jun. 17, 2025

(54) DISPENSING DEVICE, AUTOMATED ANALYSIS DEVICE, AND DISPENSING METHOD

(71) Applicant: HITACHI HIGH-TECH CORPORATION, Tokyo (JP)

(72) Inventors: Masaaki Hirano, Tokyo (JP); Masafumi Shimada, Tokyo (JP); Eiichiro Takada, Tokyo (JP); Akihisa Makino, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 349 days.

(21) Appl. No.: 17/919,820

(22) PCT Filed: Feb. 2, 2021

(86) PCT No.: PCT/JP2021/003675
§ 371 (c)(1),
(2) Date: Oct. 19, 2022

(87) PCT Pub. No.: WO2021/215068
PCT Pub. Date: Oct. 28, 2021

(65) Prior Publication Data
US 2023/0236056 A1    Jul. 27, 2023

(30) Foreign Application Priority Data
Apr. 24, 2020   (JP) ................................ 2020-077207

(51) Int. Cl.
*G01N 35/10*   (2006.01)
*G01F 23/263*  (2022.01)

(52) U.S. Cl.
CPC ....... *G01F 23/266* (2013.01); *G01N 35/1016* (2013.01); *G01N 2035/1025* (2013.01)

(58) Field of Classification Search
CPC .............. G01F 23/266; G01N 35/1016; G01N 2035/1025; G01N 2035/102
See application file for complete search history.

(56) References Cited

U.S. PATENT DOCUMENTS 3,754,444 A * 8/1973 Ure .................. G01N 35/00732
                                                    73/864.22
3,759,667 A * 9/1973 Bannister et al. .... B01L 3/0293
                                                    73/864.22
(Continued)

FOREIGN PATENT DOCUMENTS

EP         1978367 A1    10/2008
JP       H02-218962 A     8/1990
(Continued)

OTHER PUBLICATIONS

Search Report mailed Apr. 20, 2021 in International Application No. PCT/JP2021/003675.
(Continued)

*Primary Examiner* — David J Bolduc
(74) *Attorney, Agent, or Firm* — Miles & Stockbridge, P.C.

(57) ABSTRACT

An object of the present invention is to provide a dispensing device capable of preventing bubbles from jumping out of a nozzle and realizing highly accurate dispensing even though the nozzle is moved at a high speed toward a liquid level and is decelerated and stopped at a high acceleration. The dispensing device according to the present invention starts suction of a liquid in a period from when a nozzle starts to be lowered toward a liquid level of the liquid to when an end portion of the nozzle comes into contact with the liquid level of the liquid and the lowering of the nozzle is stopped (see FIG. 6).

18 Claims, 8 Drawing Sheets

(56) References Cited

U.S. PATENT DOCUMENTS

| | | | | |
|---|---|---|---|---|
| 4,141,687 A * | 2/1979 | Forrest | | B03C 1/288 |
| | | | | 435/7.92 |
| 4,864,856 A * | 9/1989 | Ichikawa | | G01F 23/2967 |
| | | | | 73/864.34 |
| 5,158,748 A * | 10/1992 | Obi | | G01N 1/38 |
| | | | | 422/522 |
| 5,192,984 A * | 3/1993 | Beecher | | G01N 1/44 |
| | | | | 356/427 |
| 5,268,147 A * | 12/1993 | Zabetakis | | G01N 35/0098 |
| | | | | 73/863.61 |
| 5,399,497 A * | 3/1995 | Kumar | | G01N 35/08 |
| | | | | 422/68.1 |
| 6,107,810 A * | 8/2000 | Ishizawa | | G01N 35/1009 |
| | | | | 422/511 |
| 9,529,009 B2 | 12/2016 | Hidetsugu et al. | | |
| 9,733,115 B2 | 8/2017 | Endo | | |
| 2004/0034479 A1* | 2/2004 | Shimase | | G01N 35/1016 |
| | | | | 702/31 |
| 2004/0048393 A1* | 3/2004 | Colin | | G01N 35/1016 |
| | | | | 436/180 |
| 2009/0000401 A1 | 1/2009 | Oonuma | | |
| 2009/0211380 A1* | 8/2009 | Tajima | | G01N 35/1016 |
| | | | | 73/864.11 |
| 2013/0259745 A1* | 10/2013 | Yamazaki | | G01N 35/1009 |
| | | | | 422/63 |
| 2014/0030167 A1* | 1/2014 | Yamashita | | G01N 35/1016 |
| | | | | 422/509 |
| 2014/0123774 A1 | 5/2014 | Hidetsugu et al. | | |
| 2015/0268230 A1 | 9/2015 | Endo | | |
| 2015/0316532 A1* | 11/2015 | Makino | | G01N 33/4905 |
| | | | | 422/64 |
| 2016/0313362 A1* | 10/2016 | Sugiyama | | G01N 35/00722 |
| 2016/0327586 A1* | 11/2016 | Yoshida | | G01N 35/1004 |
| 2016/0341756 A1* | 11/2016 | Hirano | | B01L 3/021 |
| 2017/0010294 A1* | 1/2017 | Muramatsu | | G01N 35/1011 |
| 2018/0120340 A1* | 5/2018 | Yasui | | G01N 21/31 |
| 2020/0025784 A1* | 1/2020 | Fujii | | B01L 3/021 |
| 2020/0041530 A1* | 2/2020 | Shimada | | G01N 35/1016 |
| 2020/0249249 A1* | 8/2020 | Umeki | | G01N 35/1016 |
| 2020/0264206 A1* | 8/2020 | Sarwar | | G01N 35/00603 |
| 2020/0400702 A1* | 12/2020 | Kurono | | G01N 33/487 |
| 2021/0025911 A1* | 1/2021 | Adachi | | G01N 35/1016 |
| 2021/0096148 A1* | 4/2021 | Horie | | G01F 23/2961 |
| 2021/0178386 A1* | 6/2021 | Onoki | | B01L 3/52 |
| 2021/0181224 A1* | 6/2021 | Onoki | | G01N 35/1079 |
| 2021/0270782 A1* | 9/2021 | Komori | | D04B 15/14 |
| 2022/0034930 A1* | 2/2022 | Sagae | | G01N 35/00584 |
| 2022/0128520 A1* | 4/2022 | Okoba | | G01N 35/1081 |
| 2023/0341425 A1* | 10/2023 | Tamezane | | G01N 35/1009 |

FOREIGN PATENT DOCUMENTS

| | | |
|---|---|---|
| JP | H06-87870 U1 | 12/1994 |
| JP | H07-055819 A | 3/1995 |
| JP | H10-96735 A | 4/1998 |
| JP | 2007-032285 A | 2/2007 |
| JP | 2007-093220 A | 4/2007 |
| JP | 5703376 B2 | 4/2015 |
| JP | 2015-184126 A | 10/2015 |

OTHER PUBLICATIONS

Written Opinion mailed Apr. 20, 2021 in International Application No. PCT/JP2021/003675.
Search Report mailed Apr. 19, 2024 in European Application No. 21792015.

* cited by examiner

DISPENSING DEVICE, AUTOMATED ANALYSIS DEVICE, AND DISPENSING METHOD

TECHNICAL FIELD

The present invention relates to a dispensing device that dispenses a liquid.

BACKGROUND ART

An automated analysis device is a device that performs quantitative analysis or qualitative analysis of a specific component contained in a biological sample such as blood or urine, and is indispensable for current diagnosis due to reproducibility of analysis results, high processing speed, and the like. In recent years, there is a need to reduce the amount of reagents used for analysis along with a demand for reduction in analysis cost in addition to improvement in processing capacity. Therefore, a dispensing device mounted on the automated analysis device is required to dispense a sample or a reagent at a high speed and with high accuracy.

In general, the dispensing device of the automated analysis device detects contact between a nozzle and a liquid by using a liquid level detection sensor when a sample or a reagent to be dispensed is sucked, and sucks the sample and the reagent by immersing the nozzle in the liquid in a certain range. The liquid level detection sensor increases cleaning efficiency by restricting an immersion range of the nozzle, prevents cross contamination and carry over when another type of liquid is dispensed, shortens a cleaning time, and contributes to improvement of analysis processing capacity. As a liquid level detection method, there are a pressure method described in PTL 1 and an electrostatic capacitance method described in PTL 2.

There is a case where erroneous detection occurs at a location different from the liquid level due to air bubbles or disturbance noise, and a liquid suction failure occurs. In order to avoid such erroneous detection and maintain high dispensing accuracy, there has been proposed a method of comparing a liquid level detection height with a previous value as described in PTL 3, and a method of detecting a liquid level according to a difference from a background signal without liquid retention as described in PTL 4.

CITATION LIST

Patent Literature

PTL 1: JP H07-055819 A
PTL 2: JP 5703376 B
PTL 3: JP 2007-032285 A
PTL 4: JP 2015-184126 A

SUMMARY OF INVENTION

Technical Problem

In order to improve processing capacity, it is necessary to increase a speed of each operation such as nozzle movement. In addition, in order to suppress the cleaning time, it is necessary to restrict a range in which the nozzle is immersed in the sample or the reagent. Therefore, while a speed at which the nozzle is lowered to the liquid level becomes high, a distance from when the nozzle arrives at the liquid level to when the nozzle is stopped is restricted. As a result, an acceleration at the time of nozzle deceleration increases, the fluid within the nozzle is pushed out by inertia, and there is a risk that the air or the like held at a nozzle tip jumps out from the nozzle tip. When the air within the nozzle jumps out, the liquid enters the nozzle, and there is a possibility that the liquid is sucked more than a target amount. Accordingly, an error is caused in a dispensing amount.

The present invention has been made in view of the above problems, and an object of the present invention is to provide a dispensing device capable of preventing bubbles from jumping out of a nozzle and realizing highly accurate dispensing even when the nozzle is moved at a high speed toward a liquid level and is decelerated and stopped at a high acceleration.

Solution to Problem

A dispensing device according to the present invention starts suction of a liquid in a period from when a nozzle starts to be lowered toward a liquid level of the liquid to when an end portion of the nozzle comes into contact with a liquid level of the liquid and the lowering of the nozzle is stopped.

Advantageous Effects of Invention

According to the dispensing device of the present invention, the liquid is sucked after the nozzle arrives at the liquid level and while decelerating from high-speed movement. Therefore, even though the nozzle is stopped and the fluid in the nozzle is pushed out, air at a tip of the nozzle is retained in the nozzle, and excessive suction of the liquid can be prevented. Other objects, configurations, and effects will be made apparent in the following descriptions.

DESCRIPTION OF EMBODIMENTS

First Embodiment

Figure 1:
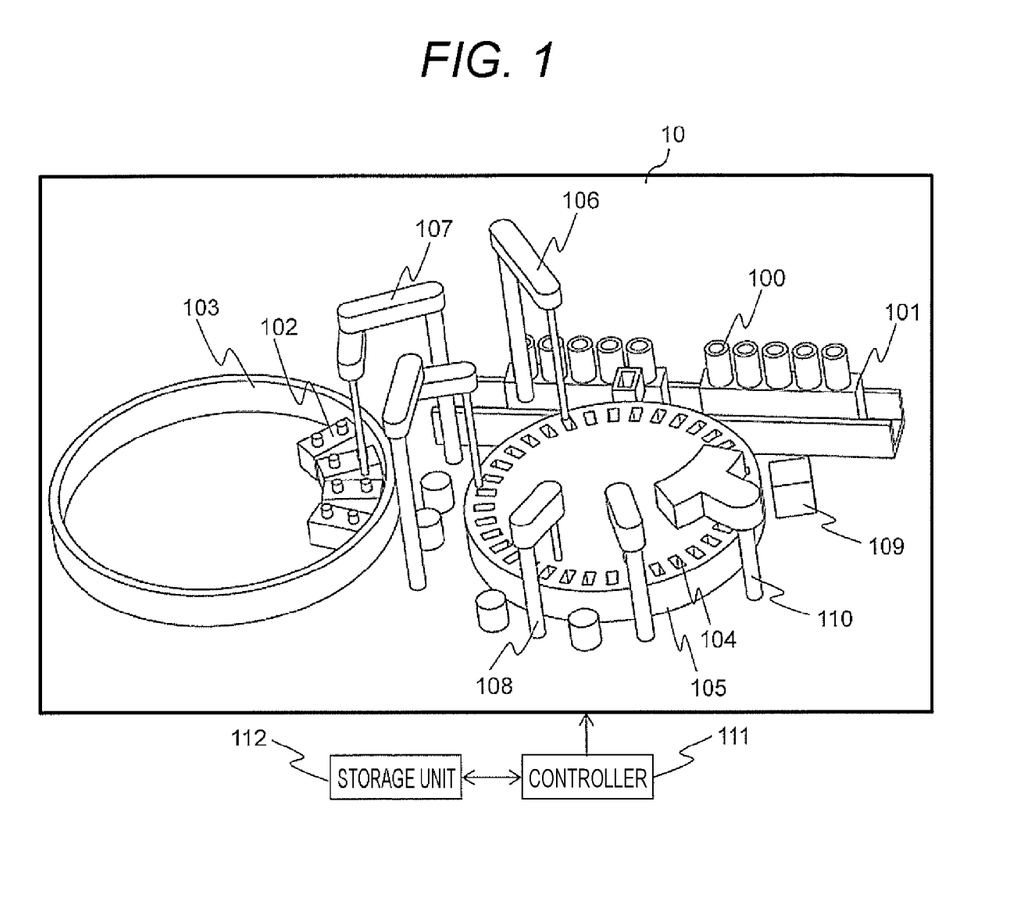
FIG. 1 is an overall configuration diagram of an automated analysis device 10 according to a first embodiment.

FIG. 1 is an overall configuration diagram of an automated analysis device 10 according to a first embodiment of the present invention. The automated analysis device 10 includes the following components: a sample container 100 that contains a sample; a sample rack 101 on which a plurality of sample containers 100 are disposed; a reagent bottle 102 that contains a reagent; a reagent disk 103 on which a plurality of reagent bottles 102 are disposed; a reaction cell 104 that mixes the sample and the reagent to obtain a reaction liquid; a cell disk 105 on which a plurality of reaction cells 104 are disposed; a sample dispensing mechanism 106 that is able to move the sample from an inside of the sample container 100 to an inside of the reaction cell 104; a reagent dispensing mechanism 107 that is able to move the reagent from an inside of the reagent bottle 102 to the inside of the reaction cell 104; a stirring unit 108 that stirs and mixes the sample and the reagent within the reaction cell 104; a measurement unit 109 that irradiates the reaction liquid within the reaction cell 104 with light to receive obtained light; a cleaning unit 110 that cleans the reaction cell 104; a controller 111 that controls units included in the automated analysis device 10; and a storage unit 112 that stores parameters for control and measured data.

The analysis of the amount of components contained in the sample is performed by the following procedure. First, a certain amount of the sample in the sample container 100 is dispensed into the reaction cell 104 by the sample dispensing mechanism 106. Next, a certain amount of the reagent in the reagent bottle 102 is dispensed into the reaction cell 104 by the reagent dispensing mechanism 107. Subsequently, the sample and the reagent in the reaction cell 104 are stirred by the stirring unit 108 to obtain a reaction liquid. If necessary, a plurality of reagents are added and dispensed into the reaction cell 104 by the reagent dispensing mechanism 107. At the time of dispensing, the sample container 100, the reagent bottle 102, and the reaction cell 104 are moved to predetermined positions by conveyance of the sample rack 101, rotation of the reagent disk 103, and rotation of the cell disk 105. After reaction is ended, an inside of the reaction cell 104 is cleaned by the cleaning unit 110, and the next analysis is performed. The measurement unit 109 measures an absorbance of the reaction liquid, and the storage unit 112 stores a measurement result thereof as absorbance data. Using the absorbance data, the controller 111 analyzes a component amount based on calibration curve data and the Lambert-Beer law.

Figure 2:
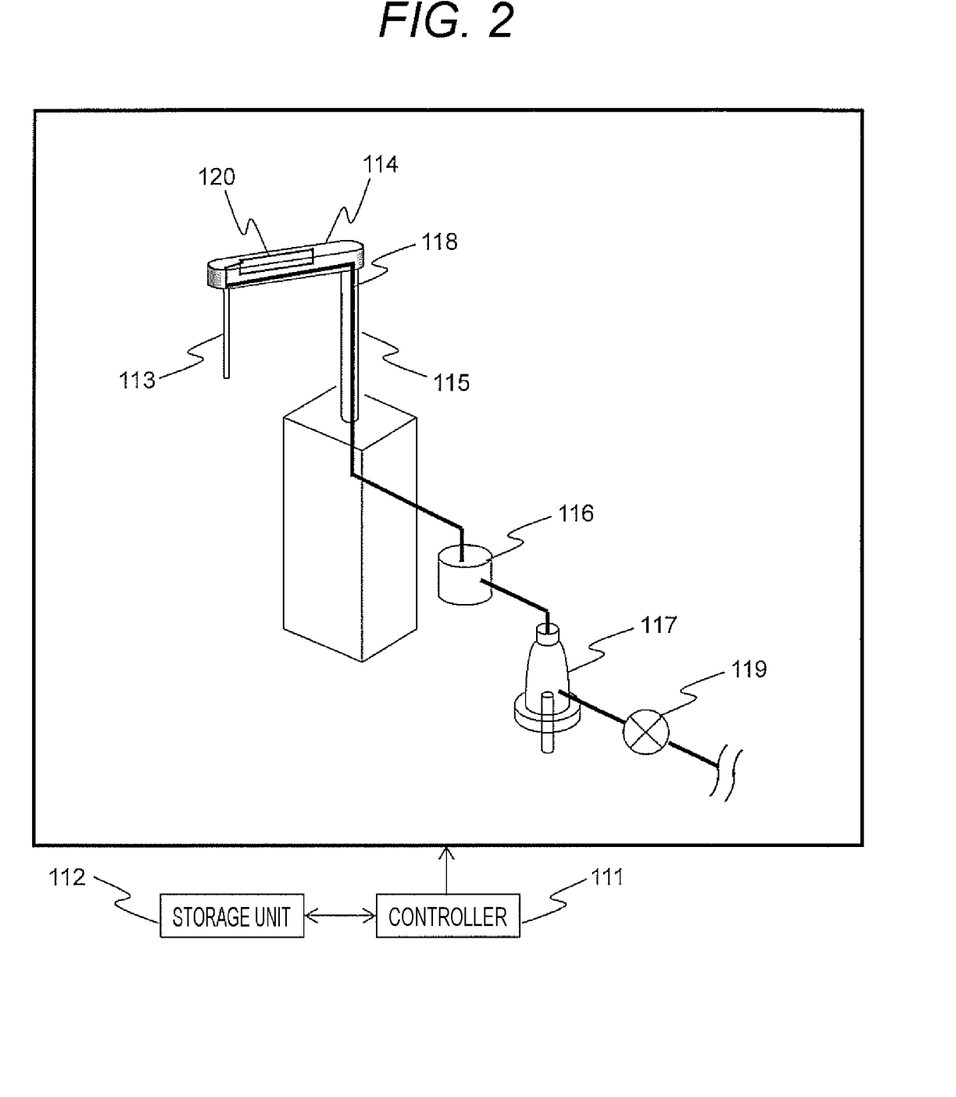
FIG. 2 is a configuration diagram of a dispensing device according to the first embodiment.

FIG. 2 is a configuration diagram of a dispensing device according to the first embodiment. This dispensing device can be applied to both the sample dispensing mechanism 106 and the reagent dispensing mechanism 107. An arm 114 that holds a nozzle 113 and can be rotatably driven is installed on a shaft 115 that can be vertically driven. The nozzle 113, a pressure sensor 116, and a syringe pump 117 are connected via a pipe 118. A dispensing flow path is configured such that a distal end side is opened by the nozzle 113 and a base side can be opened and closed by an electromagnetic valve 119. A liquid level detection sensor 120 is connected to the nozzle 113. When a liquid is dispensed, a tip of the nozzle 113 is immersed in the sample or the reagent based on a signal of the liquid level detection sensor 120, the electromagnetic valve 119 is closed, and the liquid (sample or reagent) is sucked and ejected by the syringe pump 117. After a dispensing operation is ended, the electromagnetic valve 119 is opened from the base side to supply cleaning water. The controller 111 controls reception of a sensor signal and transmission of a motor drive signal. The storage unit 112 can store driving conditions and the like for the control.

Figure 3:
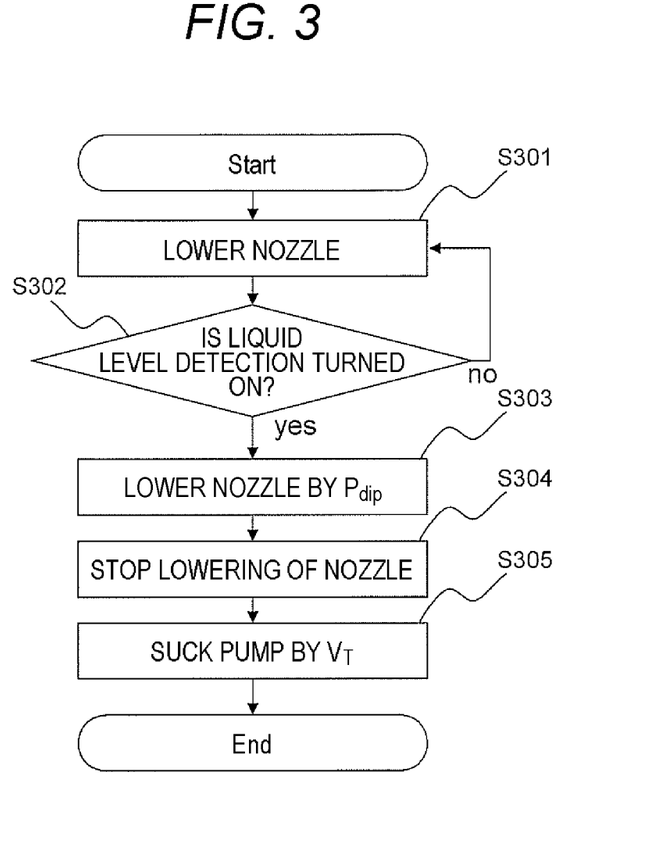
FIG. 3 is a flowchart illustrating a dispensing sequence of the related art as a comparative example.

FIG. 3 is a flowchart illustrating a dispensing sequence of the conventional art as a comparative example. The flowchart starts when system water is supplied into the nozzle 113 from the base side and segmenting air is sucked. In S301, the nozzle 113 starts to be lowered toward a liquid level. In S302, the controller 111 monitors the signal of the liquid level detection sensor 120 connected to the nozzle 113, and repeats S301 until the liquid level detection signal is received. When the tip of the nozzle 113 arrives at the liquid level, the nozzle 113 is immersed in the liquid by a distance $P_{dip}$ (S303). When the lowering of the nozzle 113 is stopped (S304), a target suction amount $V_T$ is sucked by a pump (S305).

Figure 4:
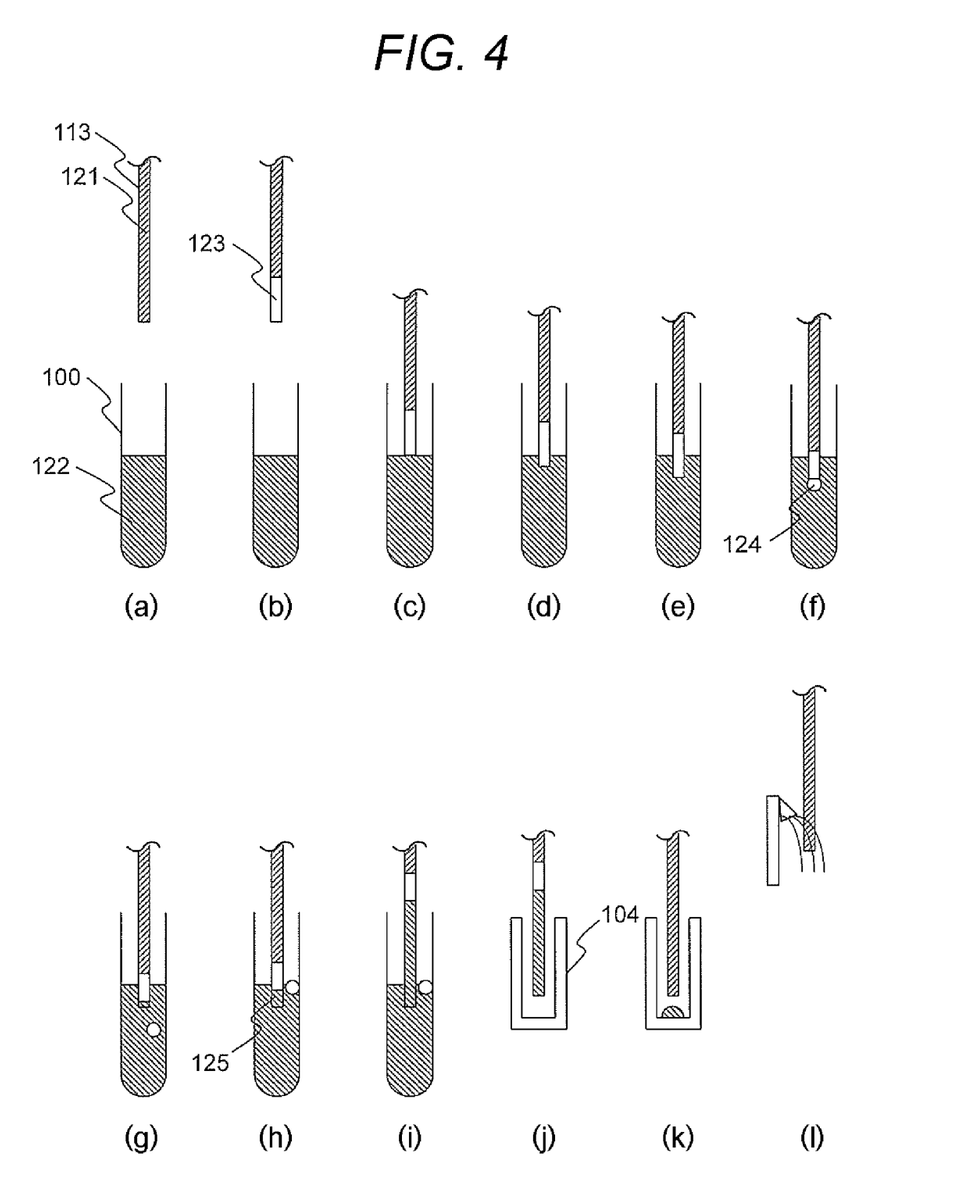
FIG. 4 is a schematic side view illustrating an operation of a nozzle 113 in the flowchart of FIG. 3.

FIG. 4 is a schematic side view illustrating an operation of the nozzle 113 in the flowchart of FIG. 3. This figure illustrates a step of lowering the nozzle 113 to a liquid level of a sample 122 and sucking the sample 122 in a sequence of dispensing the sample in the sample container 100 to the reaction cell 104.

In FIG. 4(*a*), the nozzle 113 is filled with system water 121. In FIG. 4(*b*), segmenting air 123 is sucked. The flowchart of FIG. 3 starts from here, and the nozzle 113 is lowered toward the liquid level of the sample 122 in S301. In S302, the controller 111 monitors the signal of the liquid level detection sensor 120 connected to the nozzle 113, and repeats the lowering in S301 until the liquid level detection signal is received.

When the nozzle 113 reaches the liquid level of the sample 122 as illustrated in FIG. 4(*c*), the controller 111 receives the liquid level detection signal in S302, and the processing proceeds to S303. In step S303, the nozzle 113 is further lowered by the distance $P_{dip}$. In this section, in general, a lowering speed is reduced in order to prevent loss of synchronism of the motor. FIG. 4(*d*) corresponds to S303 in FIG. 4.

In S304, the nozzle 113 is stopped. FIG. 4(*e*) corresponds to S304, and the tip of the nozzle 113 is immersed by the depth $P_{dip}$. In general, the immersion amount $P_{dip}$ is set such that air suction does not occur due to the lowering of the liquid level or the like when the sample 122 is sucked from the nozzle 113, and that the immersion amount $P_{dip}$ does not deviate from a position where a cleaning solution hits during cleaning.

When dispensing processing capacity is improved, one means is to increase a lowering speed of the nozzle 113 in S301. On the other hand, in order to maintain cleaning efficiency of the nozzle 113, it is necessary to restrict the immersion amount $P_{dip}$ without increasing the immersion amount $P_{dip}$ in S303. When high-speed lowering and immersion amount maintenance are simultaneously executed, an acceleration change at the time of stopping the nozzle increases from S301 to S302. Thus, when the nozzle 113 is stopped, the system water 121 within the nozzle 113 pushes out the segmenting air 123 by inertia as illustrated in FIG. 4(*f*), and leakage air 124 leaking from the tip of the nozzle 113 is generated. The leakage air 124 may jump out of the nozzle 113 and may be separated from the segmenting air 123 as illustrated in FIG. 4(*g*).

When the swing of the system water 121 within the nozzle 113 caused by the inertia converges, the leakage air 124 is released to an outside of the nozzle 113 as illustrated in FIG. 4(*h*), and an intrusion sample 125 having a volume equal to a volume $V_{air}$ of the leakage air 124 is held within the nozzle.

Thereafter, $V_T$ which is an original suction amount of the sample 122 is sucked by the syringe pump 117 in S305, and thus, the sample 122 having a volume of $V_{air}+V_T$ is held in the nozzle 113 as illustrated in FIG. 4(*i*).

When the nozzle 113 is moved to the reaction cell 104 in FIG. 4(*j*) and the entire amount of the sample 122 held in the nozzle 113 and a part of the system water 121 are ejected in FIG. 4(k), the sample 122 is excessively ejected to the reaction cell 104 by $V_{air}$. After the ejecting of the sample 122, an inside and an outside of the nozzle 113 are generally cleaned as illustrated in FIG. 4(l), and the processing proceeds to a next sample dispensing step.

As described above, when the acceleration change at the time of stopping is increased by increasing the lowering speed of the nozzle 113, an excessive intrusion sample 125 is caused by the separation and releasing of the leakage air 124, and an error in the dispensing amount may occur. As a result of verification in an experiment, the separation and releasing of the leakage air 124 were observed when a decelerating acceleration of stopping the lowering of the nozzle was set to 24000 mm/s$^2$ or more. As a result of the swing of the system water 121 when the lowering of the nozzle 113 is stopped, a part of the system water 121 may be mixed with the sample 122 to be segmented by the segmenting air 123, and thinning of the sample 122 may be caused.

In view of the problem of the dispensing sequence of the conventional art as described above, the present invention suppresses a dispensing amount error by controlling a suction operation of the sample 122 such that the segmenting air 123 does not leak from the nozzle 113.

Figure 5:
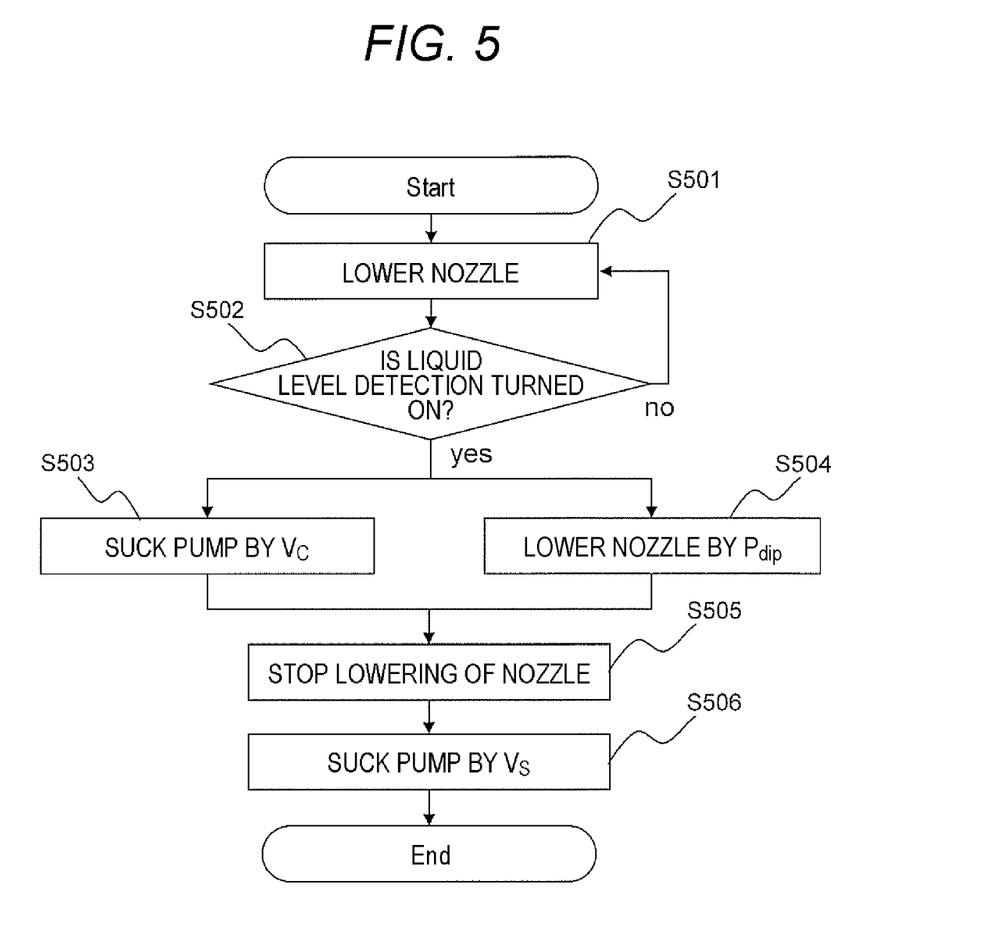
FIG. 5 is a flowchart illustrating a dispensing sequence in the first embodiment.

FIG. 5 is a flowchart illustrating a dispensing sequence in the first embodiment. This flowchart is performed by the controller 111 controlling each unit. The same applies to FIG. 8 to be described later.

The flowchart starts when the system water 121 is supplied into the nozzle 113 from the base side and the segmenting air 123 is sucked. The nozzle 113 starts to be lowered toward the liquid level of the sample 122 in S501, and S501 is repeated until the controller 111 receives the liquid level detection signal of the liquid level detection sensor 120 in S502. In S503, the sample 122 having a volume $V_C$ is sucked by the syringe pump 117. At the same time, in S504, the nozzle 113 is lowered by the distance $P_{dip}$. When the lowering of the nozzle 113 is stopped (S504), a liquid amount $V_S$ is sucked by the pump (S505). When the target suction amount is $V_T$, $V_S = V_T - V_C$.

Figure 6:
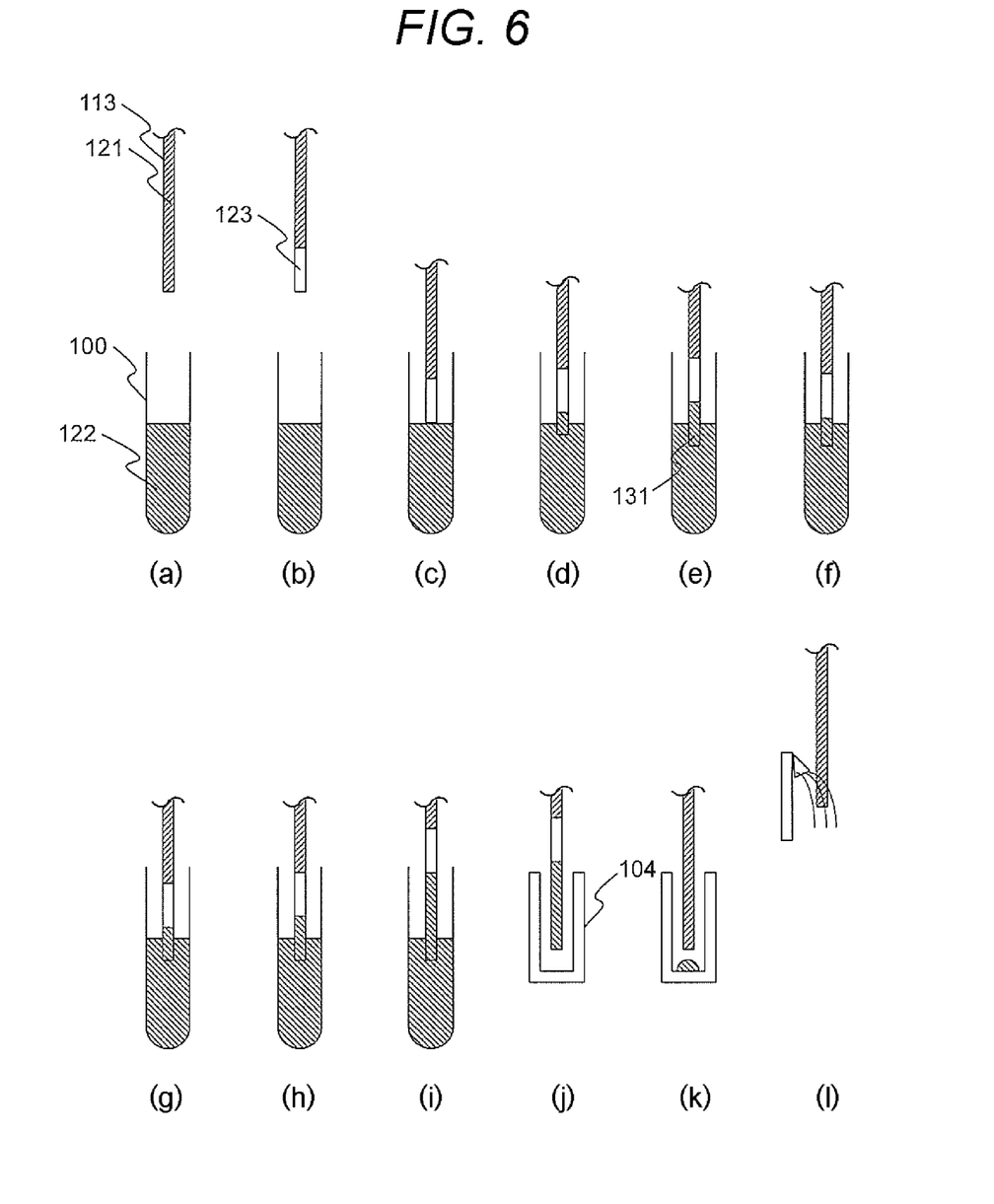
FIG. 6 is a schematic side view illustrating the operation of the nozzle 113 in the flowchart of FIG. 5.

FIG. 6 is a schematic side view illustrating an operation of the nozzle 113 in the flowchart of FIG. 5. In FIG. 6(a), the nozzle 113 is filled with the system water 121. Next, the segmenting air 123 is sucked in FIG. 6(b). The flowchart of FIG. 5 starts from this point. In S501, the nozzle 113 is lowered toward the liquid level of the sample 122, and in S502, S501 is repeated until the controller 111 receives the liquid level detection signal of the liquid level detection sensor 120.

When the nozzle 113 reaches the liquid level of the sample 122 as illustrated in FIG. 6(c), the controller 111 receives the liquid level detection signal in S502, and the processing proceeds to S503. In S503, the sample 122 having a volume $V_C$ is sucked by the syringe pump 117. At the same time, in S504, the nozzle 113 is lowered by the distance $P_{dip}$. The sample 122 is sucked in S503, and thus, the sample 122 is sucked into the nozzle 113 while the nozzle 113 is lowered as illustrated in FIG. 6(d).

When the lowering of the nozzle 113 is stopped in S505, a preliminary sample 131 is held in the nozzle 113 by $V_C$ in a state where the tip of the nozzle 113 is immersed by the depth $P_{dip}$ as illustrated in FIG. 6(e).

When the nozzle 113 is lowered at a high speed and then is stopped, the system water 121 within the nozzle 113 pushes out the segmenting air 123 by inertia as illustrated in FIG. 6(f). Accordingly, a part of the preliminary sample 131 held at the tip of the nozzle 113 is released to the outside of the nozzle, but the segmenting air 123 remains in the nozzle 113. Therefore, the segmenting air 123 is not discharged from the nozzle 113 as illustrated in FIG. 4(g).

The preliminary sample 131 pushed out by the system water 121 as illustrated in FIG. 6(g) flows into the nozzle 113 by the swing of the system water 121. While the system water 121 swings, the preliminary sample 131 repeatedly enters and exits the nozzle 113. When the swing of the system water 121 converges, the state returns to a state where the volume $V_S$ of the preliminary sample 131 is held within the nozzle 113 again as illustrated in FIG. 6(h).

In S506, the sample 122 is sucked by $V_S$ by the syringe pump 117. At this time, when the final suction target amount of the sample 122 is $V_T$, the sample 122 having $V_T$ is held in the nozzle 113 as illustrated in FIG. 6(i) by configuring the volumes as $V_S = V_T - V_C$.

Thereafter, the nozzle 113 is moved to the reaction cell 104 in FIG. 6(j), and the entire amount of the sample 122 held in the nozzle 113 and a part of the system water 121 are ejected in FIG. 6(k). Thus, the target amount $V_T$ of the sample 122 is dispensed into the reaction cell 104. After the ejecting of the sample 122, the inside and outside of the nozzle 113 are cleaned as illustrated in FIG. 6(l), and the processing proceeds to the next sample dispensing step.

As described above, the preliminary sample 131 is sucked by when the lowering of the nozzle 113 is stopped. Thus, it is possible to prevent the segmenting air 123 from being leaked out of the nozzle 113, and it is possible to realize dispensing without an error.

The pump suction operation in S503 does not necessarily need to be completed before the lowering of the nozzle is stopped in S505. However, before the system water 121 pushes out the preliminary sample 131 by a maximum amount (that is, before the state reaches the state of FIG. 6(g)), it is necessary to complete the suction of the preliminary sample 131 by an amount equal to or greater than the pushing-out amount thereof. That is, $V_C$ needs to be equal to or greater than the pushing-out amount.

FIG. 5 illustrates an example in which the suction by the syringe pump 117 is executed twice in S503 and S506, but the target suction amount $V_T$ may be sucked once in S503. However, in the automated analysis device 10, when the sample 122 is sucked into the nozzle 113, in general, a liquid pressure at this time is measured by the pressure sensor 116 and it is determined whether or not fibrin or the like in the sample is clogged in the nozzle 113 based on a pressure value. In order to accurately perform the pressure measurement, it is preferable to measure the pressure when the nozzle 113 is stationary. Therefore, when the clogging determination is executed, it is preferable to divide a suction step into two steps as illustrated in FIG. 5 and measure the pressure in S506.

First Embodiment: Conclusion

In the automated analysis device 10 according to the first embodiment, the nozzle 113 starts the suction of the liquid in a period from when the lowering of the nozzle 113 is started toward the liquid level of the liquid to when an end portion of the nozzle 113 comes into contact with the liquid level of the liquid and then the lowering of the nozzle 113 is stopped. Accordingly, as illustrated in FIG. 6(g), when the lowering of the nozzle 113 is stopped, the segmenting air 123 within the nozzle 113 can be restricted from jumping out of the nozzle 113. Therefore, the intrusion sample 125 can be suppressed to enhance dispensing accuracy.

In S503, the automated analysis device 10 according to the first embodiment sucks the liquid having the volume $V_C$. $V_C$ is equal to or greater than the maximum amount by which the preliminary sample 131 is pushed out when the lowering of the nozzle 113 is stopped. Accordingly, when the lowering of the nozzle 113 is stopped, the segmenting air 123 can be reliably held inside the nozzle 113.

Second Embodiment

Figure 7A:
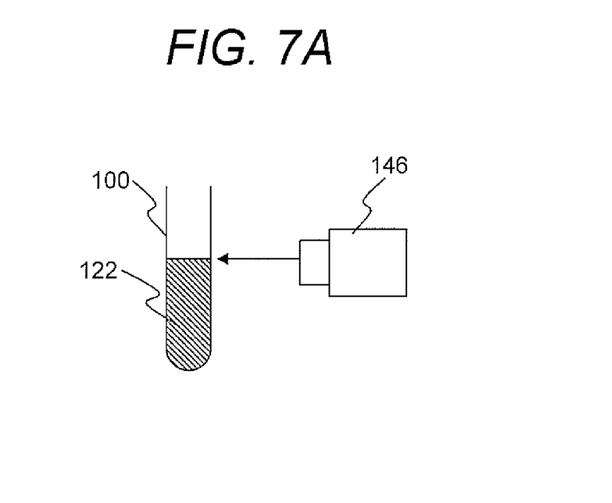
FIG. 7A is a diagram illustrating a configuration example of a liquid level measurement unit included in an automated analysis device 10 according to a second embodiment.
Figure 7B:
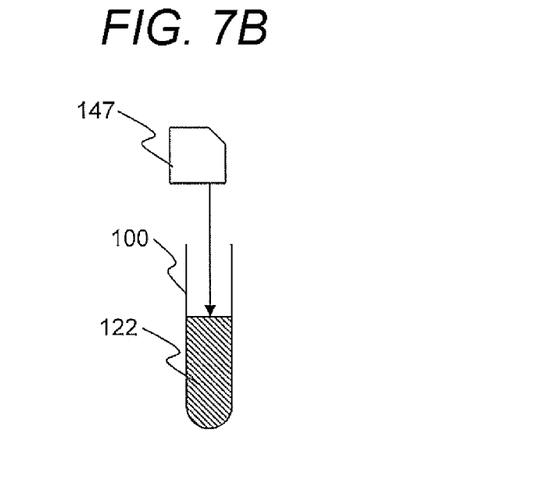
FIG. 7B is a diagram illustrating a configuration example of the liquid level measurement unit included in the automated analysis device 10 according to the second embodiment.

FIGS. 7A and 7B are diagrams illustrating a configuration example of a liquid level measurement unit included in an automated analysis device 10 according to a second embodiment of the present invention. In the second embodiment, an image sensor 146 of FIG. 7A or a displacement sensor 147 of FIG. 7B are used instead of or in combination with the liquid level detection sensor 120 described in the first embodiment. Other configurations are similar to those of the first embodiment.

An electrostatic capacitance liquid level detection sensor is most generally used as the liquid level detection sensor 120. Since the image sensor 146 and the displacement sensor 148 can measure a liquid level height in a non-contact manner, there is no need to move or come into contact with the nozzle at the time of liquid level measurement, and measurement can be performed in parallel with a nozzle moving mechanism. Therefore, it is possible to avoid a decrease in a processing speed due to a movement or cleaning operation, and a risk of contamination between samples and between reagents. The image sensor 146 and the displacement sensor 147 are desirably installed on a transport path of the sample container 100 or at a position where the nozzle 113 sucks the sample 122. The present invention is not limited to the means described above as long as the liquid level height can be measured in parallel with the nozzle movement (that is, simultaneously with the operation of the moving mechanism of the nozzle).

Figure 8:
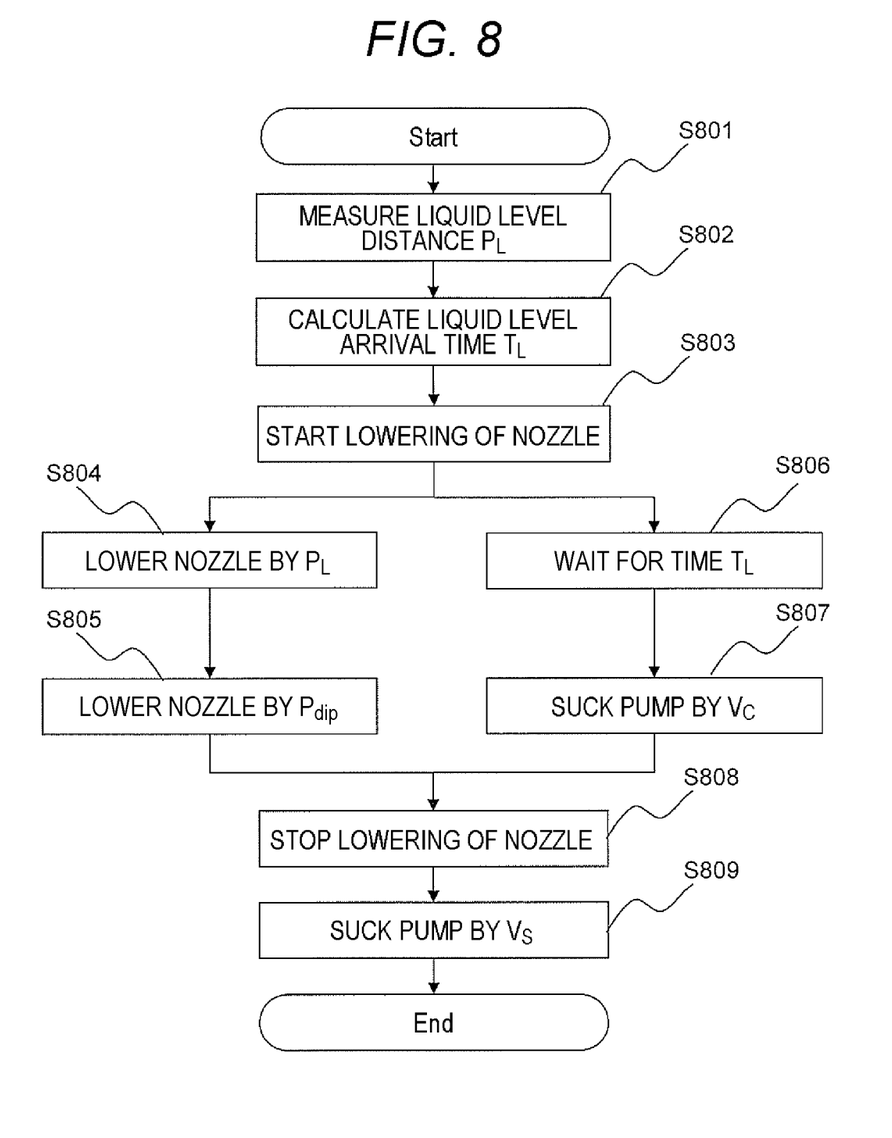
FIG. 8 is a flowchart illustrating a dispensing sequence in the second embodiment.

FIG. 8 is a flowchart illustrating a dispensing sequence in the second embodiment. In S801, the liquid level height of the sample 122 is measured, and a distance $P_L$ from the nozzle 113 to the liquid level is measured. In S802, a time $T_L$ by which the nozzle arrives at the liquid level when the nozzle 113 is lowered to the sample 122 is calculated. In step S803, the lowering of the nozzle is started.

The nozzle 113 is lowered by the distance $P_L$ in S804, and the nozzle 113 is lowered by the distance $P_{dip}$ in S805. S804 to S805 may be executed as a series of operations. In S803 to S804, the nozzle may be lowered until the liquid level detection sensor 120 detects the contact between the nozzle 113 and the liquid level.

At the same time as S804 to S805, S806 to S807 are performed. In S806, the processing waits until the time $T_L$ elapses after the lowering of the nozzle 113 is started. It is assumed that the nozzle 113 arrives at the liquid level by this waiting. The preliminary sample 131 is held within the nozzle 113 by sucking the sample 122 by the syringe pump 117 in S807.

In S806, the lowering of the nozzle 113 is stopped. At this time, even if the system water 121 pushes out the segmenting air 123, the segmenting air 123 remains inside the nozzle 113. The sample 122 is sucked by the volume $V_S$ by the syringe pump 117 in S809, thereby the sample 122 having the target suction amount $V_T$ can be held within the nozzle 113. Thereafter, when the sample 122 held in the nozzle 113 is ejected to the reaction cell 104, the dispensing of the target amount is completed.

Second Embodiment: Conclusion

The automated analysis device 10 according to the second embodiment calculates the time $T_L$ from the start of the lowering of the nozzle 113 to the arriving at the liquid level by measuring the liquid level height of the sample 122 in advance, and starts suction after the $T_L$ has elapsed. Accordingly, since a point in time at which the nozzle 113 arrives at the liquid level can be accurately achieved, the dispensing operation without an error can be realized.

Since the automated analysis device 10 according to the second embodiment measures the liquid level height by using the image sensor 146 or the displacement sensor 148, even when there is no mechanism for starting an operation of the syringe pump 117 with the signal of the liquid level detection sensor 120 as a trigger, the suction operation can be executed from when the nozzle arrives at the liquid level to when the lowering of the nozzle 113 is stopped, as in the first embodiment.

In the second embodiment, instead of waiting for the time $T_L$ in S806, a control signal instructing moving means for lowering the nozzle 113 to move by the distance $P_L$ may be counted. For example, when the nozzle 113 is lowered by a stepping motor, the number of control pulses may be counted. Even in this case, it is possible to measure a timing at which the nozzle 113 and the liquid level come into contact with each other.

About Modification Examples of Present Invention

The present invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. In addition, other components can be added, removed, and substituted to, from, and into some of the components of the aforementioned embodiments.

The controller 111 can be constituted by hardware such as a circuit device that implements the function, or can be constituted by executing software that implements the function by a calculation device such as a central processing unit (CPU). The storage unit 112 can be a storage device such as a hard disk device or a memory device.

In the above embodiments, the decelerating acceleration of the nozzle 113 being 24000 m/s$^2$ or more can be calculated from setting parameters of the automated analysis device 10. For example, a throughput required for the automated analysis device 10 is unambiguously decided by the number of samples to be analyzed, the number of reagents to be used, the number of analysis steps, the liquid amount of each liquid, and the like. That is, numerical values required as the lowering speed and the decelerating acceleration of the nozzle 113 can also be decided. Since the controller 111 sets the decelerating acceleration of the nozzle 113 according to these setting parameters, it is possible to determine whether or not the decelerating acceleration is 24000 m/s$^2$ or more.

In the above embodiments, another medium may be disposed between the liquids instead of the segmenting air. Even in this case, when the acceleration of the deceleration when the nozzle 113 is stopped, since the medium jumps out, the amount of jumping out can be suppressed by applying the present invention.

REFERENCE SIGNS LIST 10 automated analysis device
100 sample container
101 sample rack
102 reagent bottle
103 reagent disk
104 reaction cell
105 cell disk
106 sample dispensing mechanism
107 reagent dispensing mechanism
108 stirring unit
109 measurement unit
110 cleaning unit
111 controller
112 storage unit
113 nozzle
114 arm
115 shaft
116 pressure sensor
117 syringe pump
118 pipe
119 electromagnetic valve
120 liquid level detection sensor
121 system water
122 sample
123 segmenting air
124 leakage air
125 intrusion sample
131 preliminary sample
146 image sensor
147 displacement sensor

The invention claimed is:

1. A dispensing device that dispenses a liquid, comprising:
a nozzle that suctions or ejects a liquid; and
a moving mechanism that moves the nozzle,
wherein the nozzle contains a first liquid portion and starts a first suction before contacting the liquid to suction segmenting air into the nozzle during a first period which commences at a first time when the nozzle starts to be lowered toward a liquid level of the liquid and ends at a second time when an end portion of the nozzle comes into contact with the liquid level of the liquid, and the nozzle further starts a second suction of a second liquid portion during a second period before the lowering of the nozzle is stopped so that an entirety of the segmenting air remains disposed between the first liquid portion and the second liquid portion.

2. The dispensing device according to claim 1, wherein after the second period in which the second liquid is stored within the nozzle, the nozzle suctions the segmenting air farther into the nozzle, and then resumes suction of the liquid.

3. The dispensing device according to claim 2, wherein the nozzle suctions the liquid by an amount or more that is discharged to an outside of the nozzle due to the liquid present within the nozzle swinging within the nozzle when the lowering of the nozzle is stopped, in the second period after the suction of the liquid is started and by when the lowering of the nozzle is stopped.

4. The dispensing device according to claim 1,
wherein the nozzle performs the second suction for suctioning the liquid from when the nozzle comes into contact with the liquid level of the liquid to when the lowering of the nozzle is stopped, and
wherein the nozzle performs a third suction for suctioning the liquid when the nozzle stops a lowering operation after the second suction is performed.

5. The dispensing device according to claim 4, wherein the nozzle suctions, in the third suction, an amount of liquid obtained by subtracting an amount of liquid suctioned in the second suction from a target suction amount by which the liquid is suctioned.

6. The dispensing device according to claim 1, further comprising a liquid level detection sensor that detects that the nozzle comes into contact with the liquid, and
wherein the nozzle starts the suction of the liquid using a trigger that the liquid level detection sensor detects that the nozzle comes into contact with the liquid.

7. The dispensing device according to claim 1, further comprising a liquid level measurement unit that measures a liquid level height of the liquid within a container that contains the liquid before the nozzle suctions the liquid, and
wherein the nozzle starts the suction of the liquid after the nozzle moves by a distance corresponding to the liquid level height measured by the liquid level measurement unit.

8. The dispensing device according to claim 7,
wherein the liquid level measurement unit includes any or a combination of:
a liquid level detection sensor that detects that the nozzle comes into contact with the liquid;
an image sensor that captures the nozzle and the liquid; or
a displacement sensor that detects a displacement of the liquid level or the nozzle.

9. The dispensing device according to claim 7,
wherein the liquid level measurement unit is able to measure the liquid level height without coming into contact with the liquid, and
wherein the liquid level measurement unit is able to operate in parallel with the moving mechanism.

10. The dispensing device according to claim 1,
wherein if a decelerating acceleration of stopping the nozzle is 24000 mm/s$^2$ or more, the nozzle starts the first suction in a period from when the nozzle starts to be lowered toward the liquid level of the liquid to when an end portion of the nozzle comes into contact with the liquid level of the liquid and the lowering of the nozzle is stopped.

11. An automated analysis device that analyzes a sample of a liquid, comprising:
a dispensing device that dispenses a liquid,
wherein the dispensing device comprises
a nozzle that suctions or ejects a liquid; and
a moving mechanism that moves the nozzle, and
wherein the nozzle contains a first liquid portion and starts a first suction before contacting the liquid to suction segmenting air into the nozzle during a first period which commences at a first time when the nozzle starts to be lowered toward a liquid level of the liquid and ends at a second time when an end portion of the nozzle comes into contact with the liquid level of the liquid, and the nozzle further starts a second suction of a second liquid portion during a second period before the lowering of the nozzle is stopped so that an entirety of the segmenting air remains disposed between the first liquid portion and the second liquid portion.

12. A dispensing method of dispensing a liquid, comprising:

with a nozzle containing a first liquid portion, starting a first suction before contacting a liquid during a period which commences at a first time when the nozzle starts to be lowered toward a liquid level of the liquid and ends at a second time when an end portion of the nozzle comes into contact with the liquid level of the liquid; and starting a second suction of a second liquid portion during a second period before the lowering of the nozzle is stopped so that an entirety of the segmenting air remains disposed between the first liquid portion and the second liquid portion.

13. The dispensing method according to claim 12, wherein the nozzle suctions the liquid by an amount or more that is discharged to an outside of the nozzle due to the liquid present within the nozzle swinging within the nozzle when the lowering of the nozzle is stopped, in the second period after the suction of the liquid is started and by when the lowering of the nozzle is stopped.

14. The dispensing method according to claim 12, wherein the nozzle performs the second suction for suctioning the liquid from when the nozzle comes into contact with the liquid level of the liquid to when the lowering of the nozzle is stopped, and wherein the nozzle performs a third suction for suctioning the liquid when the nozzle stops a lowering operation after the first suction is performed.

15. The dispensing method according to claim 14, wherein the nozzle suctions, in the third suction, an amount of liquid obtained by subtracting an amount of liquid suctioned in the second suction from a target suction amount by which the liquid is suctioned.

16. The automated analysis device according to claim 11, wherein the nozzle suctions the liquid by an amount or more that is discharged to an outside of the nozzle due to the liquid present within the nozzle swinging within the nozzle when the lowering of the nozzle is stopped, in the second period after the suction of the liquid is started and by when the lowering of the nozzle is stopped.

17. The automated analysis device according to claim 11, wherein the nozzle performs the second suction for suctioning the liquid from when the nozzle comes into contact with the liquid level of the liquid to when the lowering of the nozzle is stopped, and wherein the nozzle performs a third suction for suctioning the liquid when the nozzle stops a lowering operation after the second suction is performed.

18. The automated analysis device according to claim 17, wherein the nozzle suctions, in the third suction, an amount of liquid obtained by subtracting an amount of liquid suctioned in the second suction from a target suction amount by which the liquid is suctioned.

* * * * *